Dec. 4, 1928.                                                          1,694,121
                                 E. GRANAT
                      ELECTRIC DISTANT CONTROL DEVICE
                    Filed Feb. 8, 1927        6 Sheets-Sheet 1
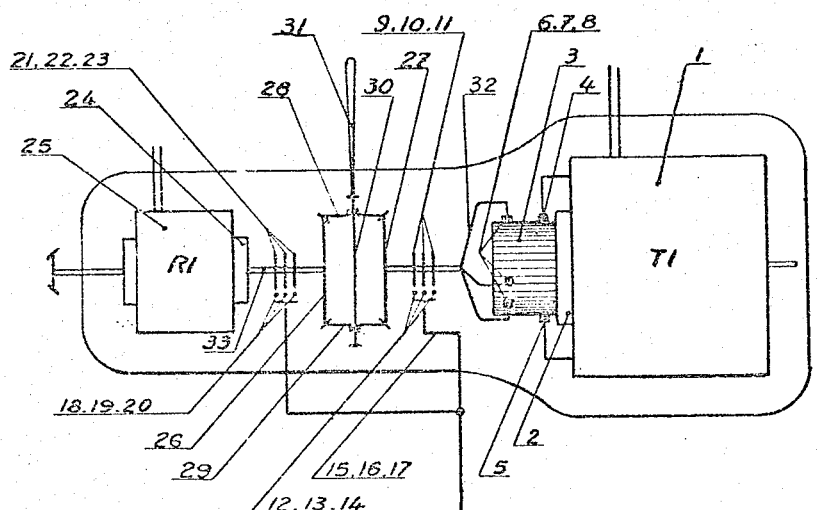
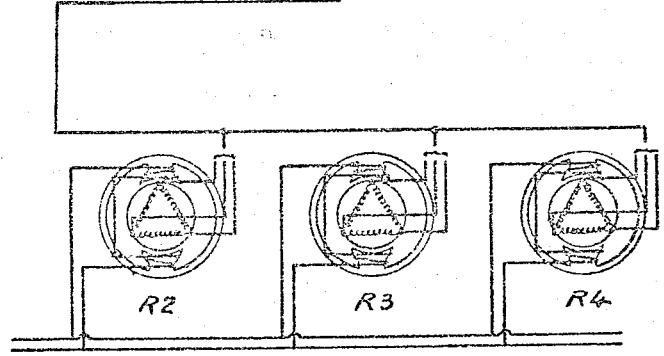
Fig. 1
E. Granat
  INVENTOR Dec. 4, 1928.  
E. GRANAT  
1,694,121  
ELECTRIC DISTANT CONTROL DEVICE  
Filed Feb. 8, 1927   6 Sheets-Sheet 2
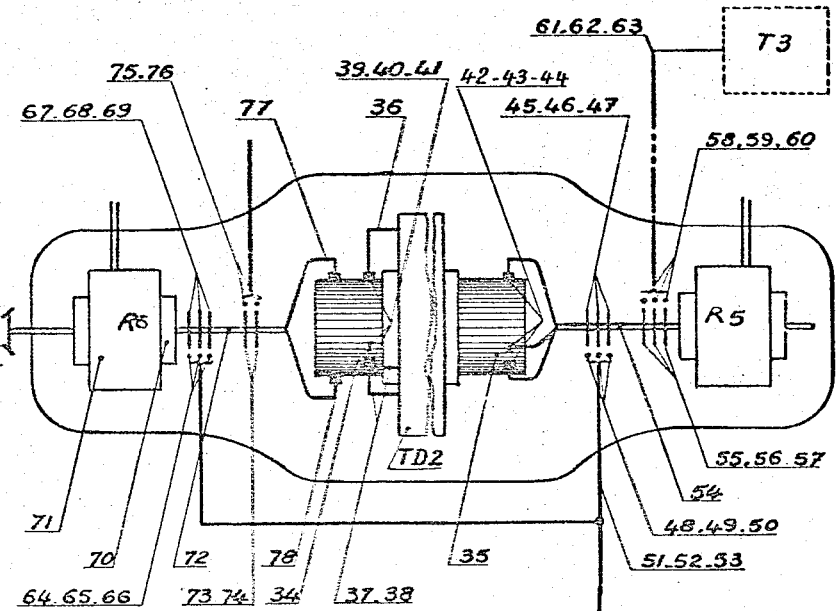
Fig. 2
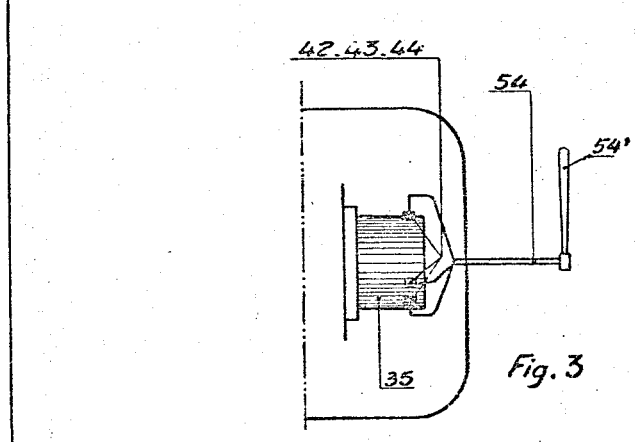
Fig. 3
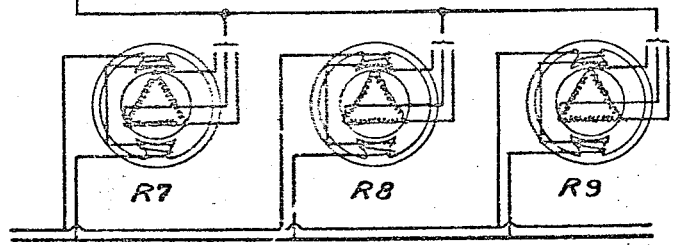
E. Granat INVENTOR
By: Marks & Clark Attys.

Dec. 4, 1928.

E. GRANAT 1,694,121

ELECTRIC DISTANT CONTROL DEVICE

Filed Feb. 8, 1927 6 Sheets-Sheet 5

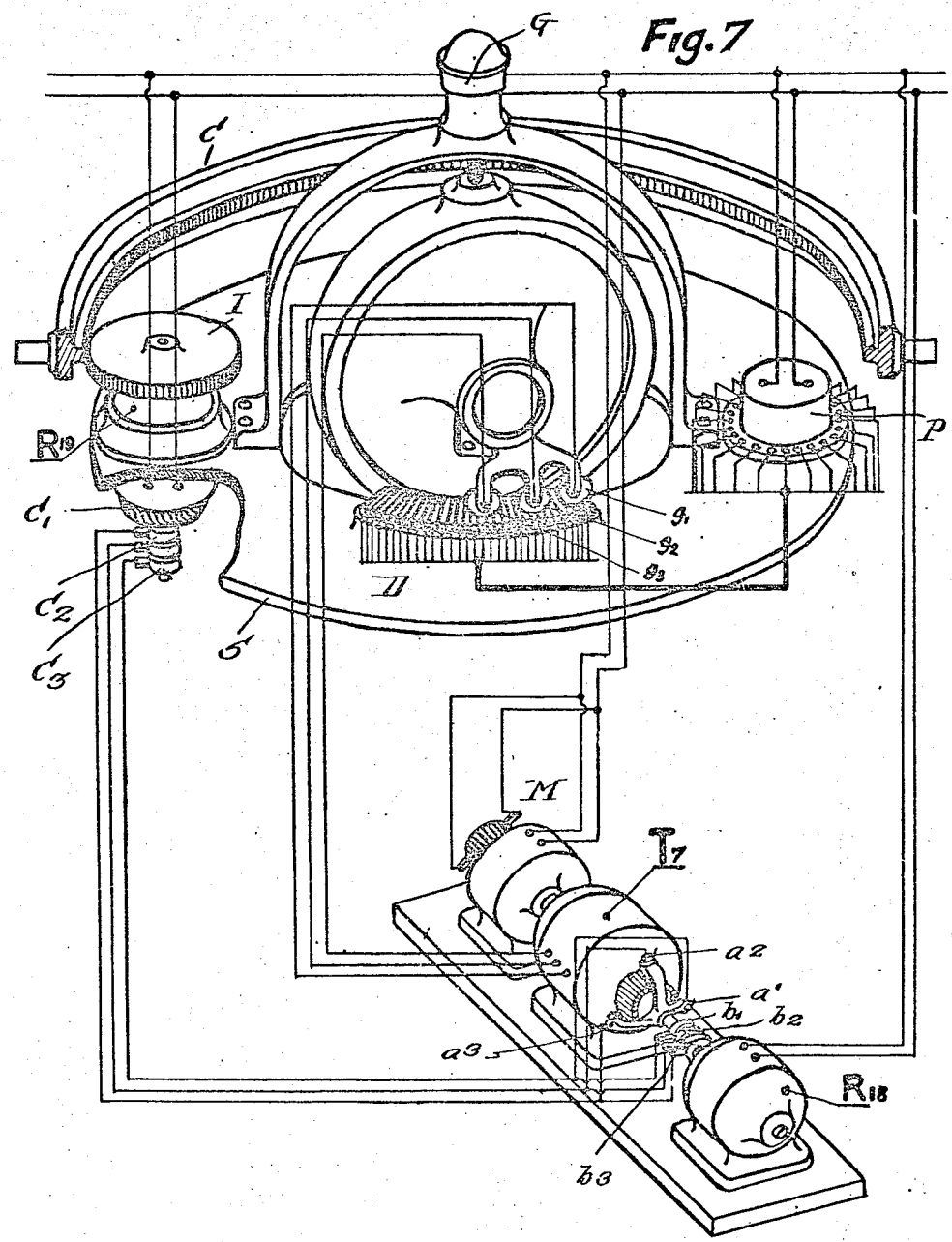

Patented Dec. 4, 1928.

1,694,121

UNITED STATES PATENT OFFICE.

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE.

ELECTRIC DISTANT-CONTROL DEVICE.

Application filed February 8, 1927, Serial No. 166,801, and in France March 3, 1926.

My invention has for its object an electric control system wherein a certain number of interconnected transmitters and receivers are adapted to move synchronously at a variable speed, the main transmitter being connected with one of the receivers through a mechanical or electrical differential device whereby the said transmitter and the several receivers are allowed to move synchronously in the direction of the movement of the part controlling the said differential.

The amplitude, speed and acceleration of the synchronous movements may be independent of the speed of the controlling part or else follow exactly the movements of the latter.

This invention is of particular interest in the case where the movement of the controlled parts must be made with a speed or acceleration much greater than that which it would be possible to obtain by a direct control of the parts of the transmission to be controlled.

Generally speaking my invention has for its object the synchronization of the movements of the transmitter with those of the several receivers, this synchronization being obtained by means of an adjustable shifting between the transmitter and one of the receivers of the controlled system. The said transmitter and receiver are both disposed at the transmitting station and are suitably connected together, the receiver at the transmitting station ensuring through a proper connection the permanency of the shifting and thereby the continuous rotation of the receiving motors at an adjustable speed given by the amplitude of the original shifting provided by a controlling part acting directly or from a distance.

In the case of a transmitter working as a motor or a generator on the commutator whereof rubs a set of brushes collecting potentials of variable phase according to their position, the said set of brushes may be mechanically connected with the receiver of the transmitting station whereby the permanency of the shifting of the potentials under the brushes is ensured with reference to that corresponding to the actual position of the receiver of the transmitting station which is controlled by the position of the movable set of brushes. The part producing the original shifting can control for instance the planet pinions of a differential disposed on the shaft connecting the receiving motor of the transmitting station with the set of brushes. Thereby any movement originally given to the set of planet pinions of the differential when the receiver is at rest will be transmitted to the set of brushes of the transmitter and this will cause a corresponding rotation of the field of the receiver and consequently of the secondary of the differential. The set of planetary pinions being stationary, the rotation of the secondary of the differential will make the set of moving brushes of the transmitter move by the same amount. The shifting provided by the movement of the controlled part will thus remain constant and cause a continuous rotation of the several receiving motors connected in parallel, the speed of rotation being variable and depending solely on the amplitude of the original shifting.

I arrive at the same result through an electric differential; the receiving motor of the transmitting station controls a movable set bearing the brushes feeding the transmitter so as to shift in a continuous manner the origin of the potential on the transmitter commutator; the initial shifting is then produced by a second set of movable brushes which feed the several controlled receiving motors and the rotation of which is controlled by a lever either directly or through a transmitting relay. The means of controlling the two sets of brushes can besides be interchanged.

The initial shifting can also be obtained in the transmitter working as a motor or a generator by phase shifting the current feeding the transmitter. In this case, the said feeding current is taken from an auxiliary transmitter through a set of movable brushes rubbing on the commutator of the said auxiliary transmitter and the position of which is controlled by a suitable part so as to give the said current the required phase shifting.

In another similar form of execution, the rotation of the transmitter of the main transmitting station is caused by coupling the said transmitter with an auxiliary transmitter over which a set of movable brushes is adapted to move; the said brushes are connected with equidistant terminals of the distributed field piece of the main transmitter and are controlled by a lever which can rotate round the commutator of the auxiliary transmitter whereby the origin of the potentials in the transmitter of the main station is modified.

The above described devices can be used for instance for controlling guns rotated by motors moving synchronously with a finding instrument controlled by the receiving motor of the transmitting station.

Evidently the means disclosed for changing the origin of the potentials in a transmitter with rotating brushes can be used for modifying the distribution of the potentials in the transmitter of a distant control system of any type and in particular of a distant control system the receivers of which are not controlled one by the other.

The disclosed devices can be used with transmitters and receivers of any known type.

The present invention can be used for instance in a control system to be controlled by an apparatus driven by a small power the movements of which produces the phase shifting of the main transmitter, this phase shifting being brought back to zero by the movement of a receiver controlled by the said transmitter as soon as the apparatus stops in a new position; all the receivers of the system including the one which brings the phase shifting back to zero are thus controlled by the apparatus driven by a small power.

This application is of great interest in the case of apparatuses such as gyroscopic compasses which can provide no other work, without interfering with the law of their movement, beyond that of establishing electrical contacts between the parts borne by them and the contact parts in front of which these parts move. My invention allows repeating parts or different control devices to be easily controlled by such apparatuses. In view of this the apparatus of small power bears contact parts such as rollers which rub on the commutator of a potentiometer fed by the mains and are connected with one of the windings of the transmitter; the movement of the said apparatus produces the phase shifting of the two windings of the transmitter and thereby the rotation of the receiver which is connected with said windings; the last mentioned receiver is thus made to start and the permanency of its rotation is ensured and therewith the rotation of the other receivers controlled by the transmitter; one of these receivers which serves to bring back the phase-shifting to zero acts on the part bearing the potentiometer commutator so as to bring it back into its normal position with reference to the apparatus driven by a small power. After each movement of the latter, the phase shifting between the transmitter and the receiver keeping up the said phase-shifting is thus suppressed and the stoppage of all the receivers is ensured.

In the particular case of a gyroscopic compass the part bearing the commutator of the potentiometer and controlled by the receiver bringing the shifting to zero may be a rotating "phantom" plate of the type described in my Patent No. 1,569,922 the said phantom plate bearing the gyroscope and the receiver bringing the phase shifting back to zero as described in my said patent.

The connection between one of the windings of the transmitter and the commutator of the potentiometer can be made through the contact parts borne by the gyroscope or similar apparatus, in which case the potentiometer is fed by the mains.

The potentiometer and one of the windings of each receiver and, according to the case, of the main transmitter working as a motor or of the motor rotating the main transmitter working as a generator are fed by D. C. mains. Of course they may also be fed with one-phase or polyphase A. C. provided the connections are suitably modified.

On appended drawings are shown by way of example a certain number of forms of execution of my present invention using receivers and transmitters of the types set forth in my prior specifications.

Fig. 1 is a general diagram of an arrangement working with a mechanical differential.

Fig. 2 shows a form of execution of a similar arrangement comprising an electric differential and controlled from a distance through a control transmission.

Fig. 3 illustrates a modified form of the preceding arrangement wherein the control is effected directly from the transmitting station itself.

Fig. 7 is a perspective view of an arrangement corresponding to the diagram shown on Fig. 6.

Figure 4:
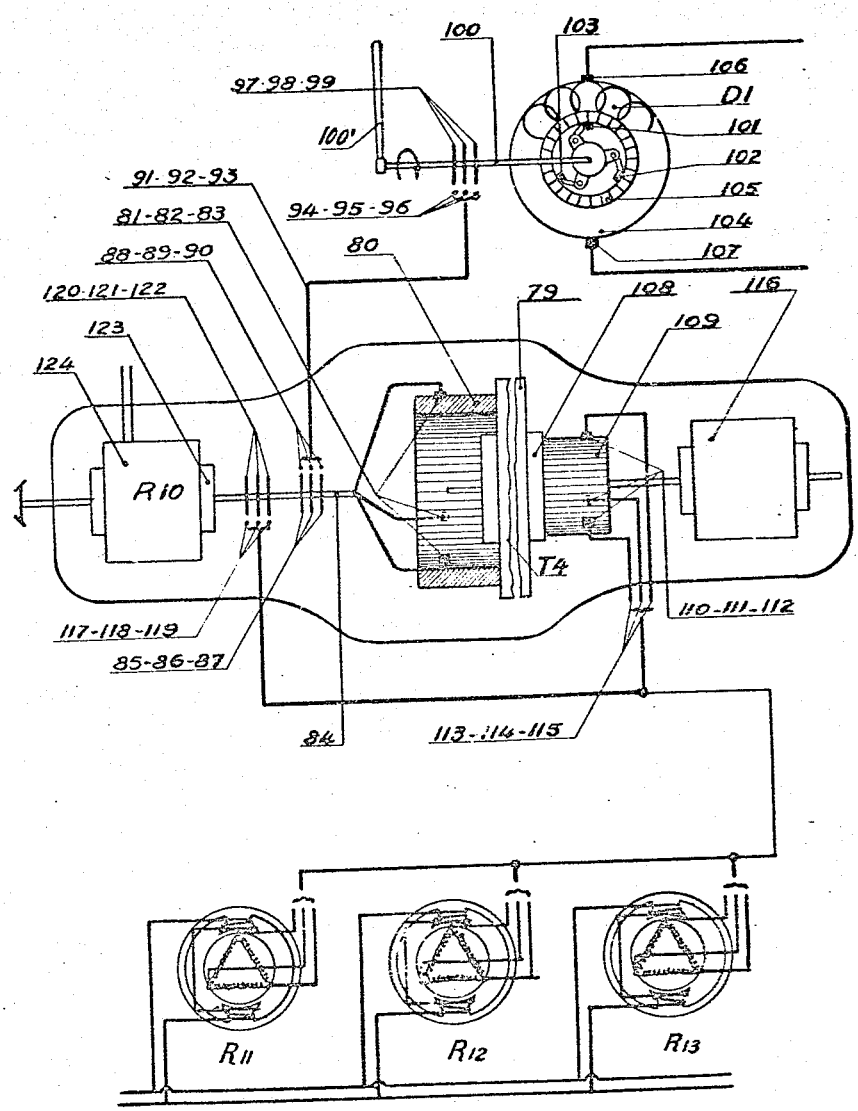
Fig. 4 shows a distant control device wherein the origin of the potentials in the transmitter working as a generator is modified by a phase-shifting of the exciting current of the transmitter fed through the movable brushes of an auxiliary transmitter of any suitable type.

On Fig. 1 the transmitter $T_1$ comprises a stator fed with D. C. and a rotor 2 on the commutator 3 of which rub the two stationary brushes 4 and 5 which feed the rotor. The rotating brushes 6, 7, 8 which collect the potentials to be sent into the receivers are mounted on a movable set 32 controlled as explained hereinbelow by the controlling motor. The rotating brushes 6, 7, 8 are connected with the rotors of the several receivers (controlling motor $R_1$ controlled motors $R_2$ $R_3$ $R_4$) the stators of which are fed with D. C. through the rings 9, 10, 11 on which rub three brushes 12, 13, 14 connected through the wires 15, 16, 17 with the receivers. In particular the controlling receiver $R_1$ is fed by the brushes 18, 19, 20 connected respectively with the wires 15, 16, 17 and rubbing on the rings 21, 22, 23 borne by the three-phase rotor 24 of the receiver $R_1$.

The set 32 of the movable brushes is controlled by the shaft 33 controlled by the rotor of the controlling receiver $R_1$; on the shaft 33 is disposed a differential the pinion 26 of which is keyed to the part of the shaft 33 which is secured to the rotor of $R_1$ and the pinion 27 of which is keyed to the part which is secured to the set 32. The planetary pinions 28 and 29 are borne by a mounting 30 which can be rotated by the controlling lever 31.

This device works in the following manner: The arrangement being at rest and under tension, the transmitter working as a motor rotates at a constant speed. The rotors of the several receivers take a given position depending on the initial position of the movable brushes on the commutator. If the control lever 31 is actuated, the planetary pinions 28 and 29 move around the shaft 33; the pinion 26 being stationary the pinion 27 will rotate and therewith the movable brushes 6, 7, 8. The feeding phase will thus be changed in the rotors of the several receivers which will consequently move by the same angle in view of bringing back into coincidence the fluxes produced by the rotor and by the stator. The controlling receiver $R_1$ will consequently rotate the pinion 26 which will draw along with it, the planetary pinion set being stationary, the set 32 of movable brushes, the rotation of which produces in its turn if in the proper direction, a fresh rotation of the rotors of the several receivers. Through this arrangement the phase shifting of the potentials under the rotating brushes is kept constant with reference to the potentials corresponding to the position at the moment considered of the rotors of the receivers. Thus the rotors rotate and drive through a suitable demultiplying gear the parts to be controlled in a continuous manner at a speed depending on the value of the initial shifting. At the same time the positions of the several rotors will correspond and the position of the part controlled by the motor $R_1$ will be given by the parts controlled by the receivers $R_2$ $R_3$ $R_4$. The speed of the several receivers increases with the original phase-shifting or otherwise stated for obtaining increasing speeds the controlling lever should be moved from its initial position up to the position corresponding to the maximum speed which is at 90° with the initial position. To obtain the stoppage of the transmission, it is sufficient to bring the brushes back into their initial position whereby the phase shifting is suppressed and the stoppage of the rotors is ensured.

The working would of course be the same if the transmitter were to work as a generator. Moreover the controlling part which transmits the initial shifting may be controlled indirectly through the set of planetary pinions of an intermediary differential the primary of which may be moved by a gunner or marker for instance by a suitable angle and the secondary of which is moved by the controlling part at the transmitting station. This arrangement allows the movement of the receivers to be controlled by the moving part.

Fig. 2 shows a simpler entirely electric arrangement. In view of this a differential transmitter $TD_2$ is used the rotor of which is provided with two commutators 34 and 35. The three-phase stator winding is fed through three equidistant terminals 36, 37, 38 connected with three stationary brushes 39, 40, 41 rubbing on the commutator 34. The transmitter which is supposed to be working as a motor is fed with D. C. through the brushes 77, 78 rubbing on the commutator 34.

On the other hand 3 movable brushes 42, 43, 44 borne by a set 54 are connected with the rotors of the receivers (controlling motor $R_6$, controlled motors $R_7$, $R_8$, $R_9$) through three rings 45, 46, 47 on which rub three brushes 48, 49, 50 which are connected through the wires 51, 52, 53, with the receivers. The initial shifting is provided by rotating the set 54 of movable brushes by the desired angle through a distant control device.

On the figure a receiving motor $R_5$ is shown controlling directly the set of movable brushes and controlled by a transmitter $T_3$ placed at the control station. The transmission is provided by the wires 61, 62, 63 leading to the brushes 58, 59, 60 rubbing on the rings 55, 56, 57 of the receiver $R_5$. The control can be also made according to requirements directly from the station of the transmitter $TD_2$ through a lever 54' actuating directly the movable set (Fig. 3).

The rotor of the receiver $R_6$ is fed as explained through the wires 51, 52, 53 connected with the brushes 64, 65, 66 rubbing on the rings 67, 68, 69 feeding the rotor 70 of the motor $R_6$ the stator 71 of which is fed with D. C. In view of ensuring the permanency of the phase shifting this rotor 70 controls the movable set bearing the D. C. feeding brushes 77, 78 of the transmitter; these brushes are connected with the rings 73, 74 on which rub the brushes 75, 76 feeding the D. C.

The working is similar to that of the device shown on Fig. 1; the wires being fed from the mains, the differential-transmitter rotates at a constant speed and the receiving motors take a given position depending on the relative setting of the brushes 77, 78 on one hand and 42, 43, 44 on the other. If a rotating motion is imparted to the rotating brushes 42, 43, 44 a corresponding movement of the rotors of the several receivers will be produced. In particular the receiver $R_6$ at the transmitting station which may control a part such as a spy-glass, an index or the like disposed at the said transmitting station rotates at the same time as the set of brushes 77, 78 whereby the origin of the potentials in the transmitter is shifted. The brushes 42, 43, 44 feeding the receivers being stationary, the potentials will be again phase-shifted under the brushes and consequently the receivers continue rotating and therewith the set of brushes 77, 78 and so forth. The rotation of the receivers will be continuous as in the preceding case as long as the brushes 42, 43, 44 keep the positions given to them. The movement is stopped by bringing the brushes 42, 43, 44 back into their initial position in view of reducing the shifting to zero. Evidently the receiver $R_6$ may be fed as hereinabove through the rings 45, 46, 47 connected with the three rotating brushes, the receivers $R_7$, $R_8$, $R_9$ being then fed through a line leading from the three stationary brushes 36, 37, 38. The working would remain the same, but with the advantage of starting the receivers $R_7$ $R_8$ $R_9$ only after the starting of the receiver $R_6$ the rotation of which shifts the origin of the potentials under the brushes 36, 37, 38.

The working would be the same in the case where the differential transmitter works as a generator. It would again not be different if the part played by the two movable sets were interchanged, the set 72 being controlled by $R_5$ and the set 54 by $R_6$.

Fig. 4 shows a similar arrangement wherein however the initial shifting of the brushes feeding the receivers is replaced by an initial phase-shifting of the potentials feeding the transmitter which in the case illustrated is supposed to work as a generator. This transmitter $T_4$ comprises a distributed stator 79 provided with a commutator 80 on which rub three equidistant brushes 81, 82, 83 borne by the holder 84 controlled by the controlling receiver. The movable brushes receive the current from the wires 91, 92, 93 connected with the brushes 88, 89, 90 rubbing on the rings 85, 86, 87 connected with the movable brushes. The initial shifting of the potentials on the commutator 80 is obtained by feeding the wires 88, 89, 90 by a movable holder 100 of three equidistant brushes 101, 102, 103 rubbing on the commutator 105 connected with the distributed winding 104 of a static transmitter D. This latter transmitter is fed with D. C. through two stationary points 106, 107. The wires 91, 92, 93 lead in view of this to three brushes 94, 95, 96 rubbing on the rings 97, 98, 99 secured to the holder 100 and connected with the brushes 101—102—103.

On the other hand the rotor 108 of the transmitter 4 rotated by the auxiliary motor $M_1$ is provided with a commutator 109 on which rub three brushes 110, 111, 112 connected with the wires 113, 114, 115 of the line connected with the different receiving motors (controlling motor of the transmitter station $R_{10}$, controlled motors $R_{11}$, $R_{12}$, $R_{13}$). In the case illustrated the rotor 108 is rotated by the auxiliary motor 116 and the transmitter works as a generator. The motor $R_{10}$ the stator 124 of which is fed with D. C. has its rotor 123 fed through the connecting wires 113, 114, 115 leading to the three brushes 117, 118, 119 rubbing on the three feed rings 120, 121, 122 of the rotor.

The working is easy to understand. When at rest and under tension the rotor of the transmitter $T_4$ rotates at a constant speed and the receivers occupy, a given position according to the relative position of the sets of movable brushes 100 and 84 of the transmitter of the distant control arrangement and of the auxiliary transmitter $D_1$ feeding $T_4$ with current of a given phase. If the movable set 100 is rotated through the lever 100' the voltage in the transmitter stator will be shifted and thereby the field will correspondingly rotate and the phase of the voltage under the stationary brushes 110, 111, 112 will be shifted whereby the rotors of the receivers will be set rotating. The receiver $R_{10}$ makes thus the movable brushes 81, 82, 83 rotate and consequently the stator field is again shifted and the receivers are again rotated and so on.

Figure 5:
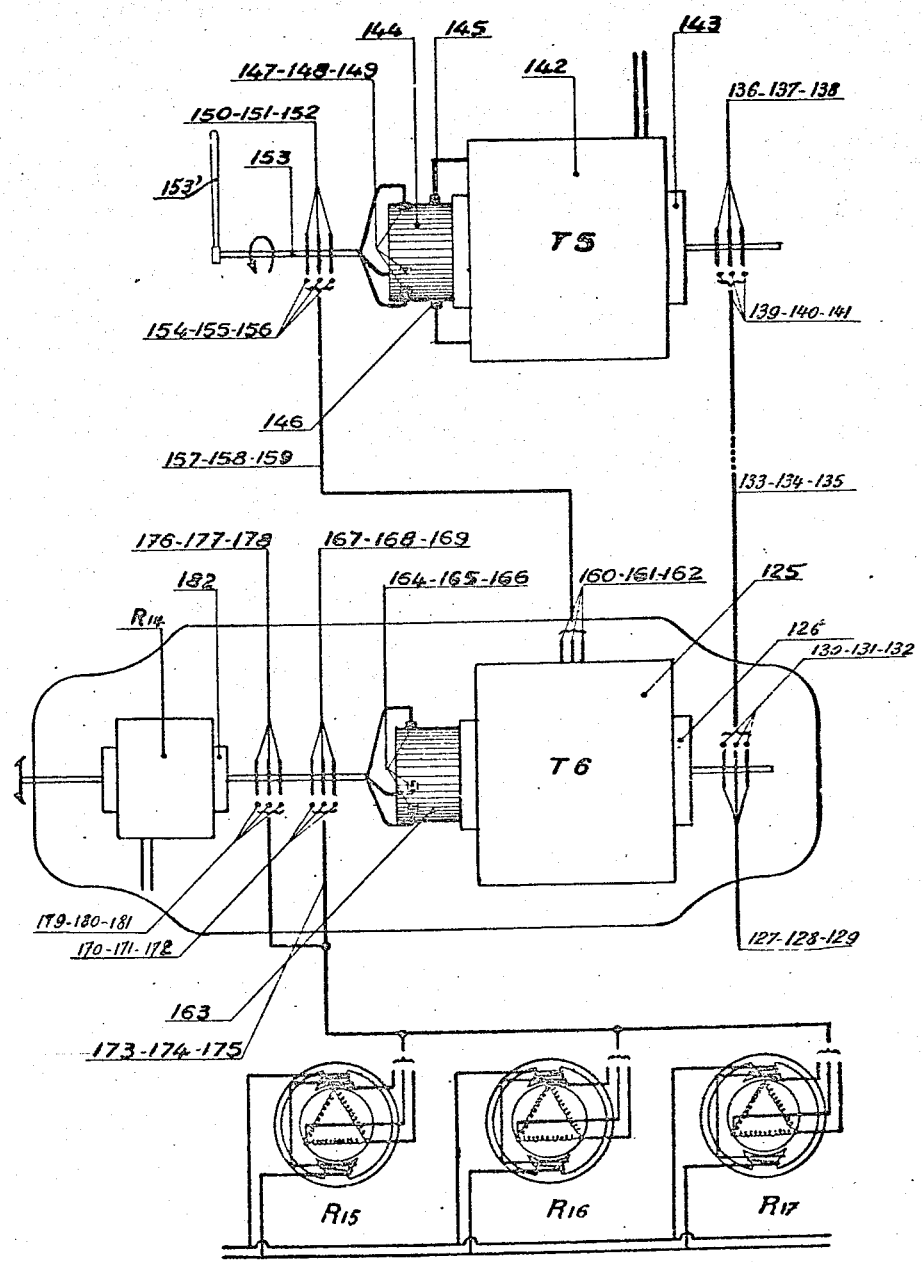
Fig. 5 is a modification of Fig. 4 wherein the transmitter is coupled with an auxiliary transmitter in view of its working as a generator. The shifting of the origin of the potentials of the main transmitter is obtained through a lever moving with the set of movable brushes of the auxiliary transmitter.

The continuous uniform rotation of the receivers thus obtained subsists as long as the brushes 101, 102, 103, remain in the position given to them. To stop it, it is sufficient to bring back the brushes into their initial position. Here again it is easy to imagine a device wherein $T_4$ is a generator or wherein the brush holder 84 is stationary and the brushes 110, 111, 112 are controlled by $R_{10}$. The arrangement shown on Fig. 5 allows also the origin of the potentials in the transmitter to be altered. This transmitter $T_6$ is coupled with an auxiliary transmitter $T_5$ disposed at the control station through the connecting wires 133, 134, 135 connecting the brushes 139, 140, 141 rubbing on the rings 136, 137, 138 of the rotor 143 of $T_5$ with the brushes 130, 131, 132 rubbing on the rings 127, 128, 129 feeding the rotor 126, of $T_6$.

The stator 125 of $T_6$ is fed through three equidistant points 160, 161, 162 by the wires 157, 158, 159 connected with the brushes 154, 155, 156. These latter brushes rub on the rings 150, 151, 152 fed through the movable brushes 147, 148, 149 borne by the holder 153 and rubbing on the commutator 144 of the rotor 143 of $T_5$.

The stator of $T_5$ is fed with D. C. or A. C. and feeds its rotor through two wires leading to two stationary brushes 145, 146 rubbing on the commutator 144 of the rotor.

The set of movable feeding brushes 164, 165, 166 which rub on the commutator 126 of $T_6$ is controlled by the rotor 182 of the controlling receiver $R_{14}$. These movable brushes are electrically connected with three rings 167, 168, 169 on which rub the brushes 170, 171, 172 connected with the wires 173, 174, 175 feeding the rotors of the controlling motor $R_{14}$ and of the controlled motors $R_{15}$ $R_{16}$ $R_{17}$ the corresponding stators being fed with D. C. In particular the rotor of $R_{14}$ is fed through the rings 176, 177, 178 on which rub the brushes 179, 180, 181 connected with the wires 173, 174, 175 of the connecting line.

The characteristic point of the working of this arrangement resides in that the transmitters $T_5$ $T_6$ rotate in constant synchronism and that the rotation of the inducing field of $T_6$ is obtained by the phase shifting of the feed voltage of the stator, this phase-shifting being obtained by acting on the lever 153′ of the movable set 153 which moves round the commutator 143 of $T_5$. The stator field of $T_5$ being shifted by a corresponding amount the result is a shifting of the potentials under the brushes 164, 165, 166 feeding the receivers. The continuous movement is obtained like in the preceding cases by the fact that the controlling receiver $R_{14}$ ensures the rotation of the brushes 164, 165, 166 which thus always collect potentials shifted by the same amount with reference to the potentials corresponding to the position of the receivers at the moment considered.

Evidently the transmitters $T_5$ and $T_6$ can be indifferently synchronized generators or motors. Outside the described control devices, the differential above disclosed transmission devices comprising a static transmitter $D_1$, and the transmitter $T_4$ (Fig. 4) or the transmitters $T_5$ and $T_6$ (Fig. 5) can be used per se for shifting the potentials feeding any receivers in two different manners through two movable sets disposed at two different stations.

In a general manner it is possible with any of the above described transmissions to vary at any moment the amplitude of the movement of the controlling part in view of varying as desired the speed of the receivers.

The arrangement may moreover comprise several transmitting stations for feeding simultaneously or in succession the same receivers in which case the said receivers comprise two polyphase windings each fed from a separate transmission station. Thus each transmitter actuates independently all the receivers controlled by it.

Figure 6:
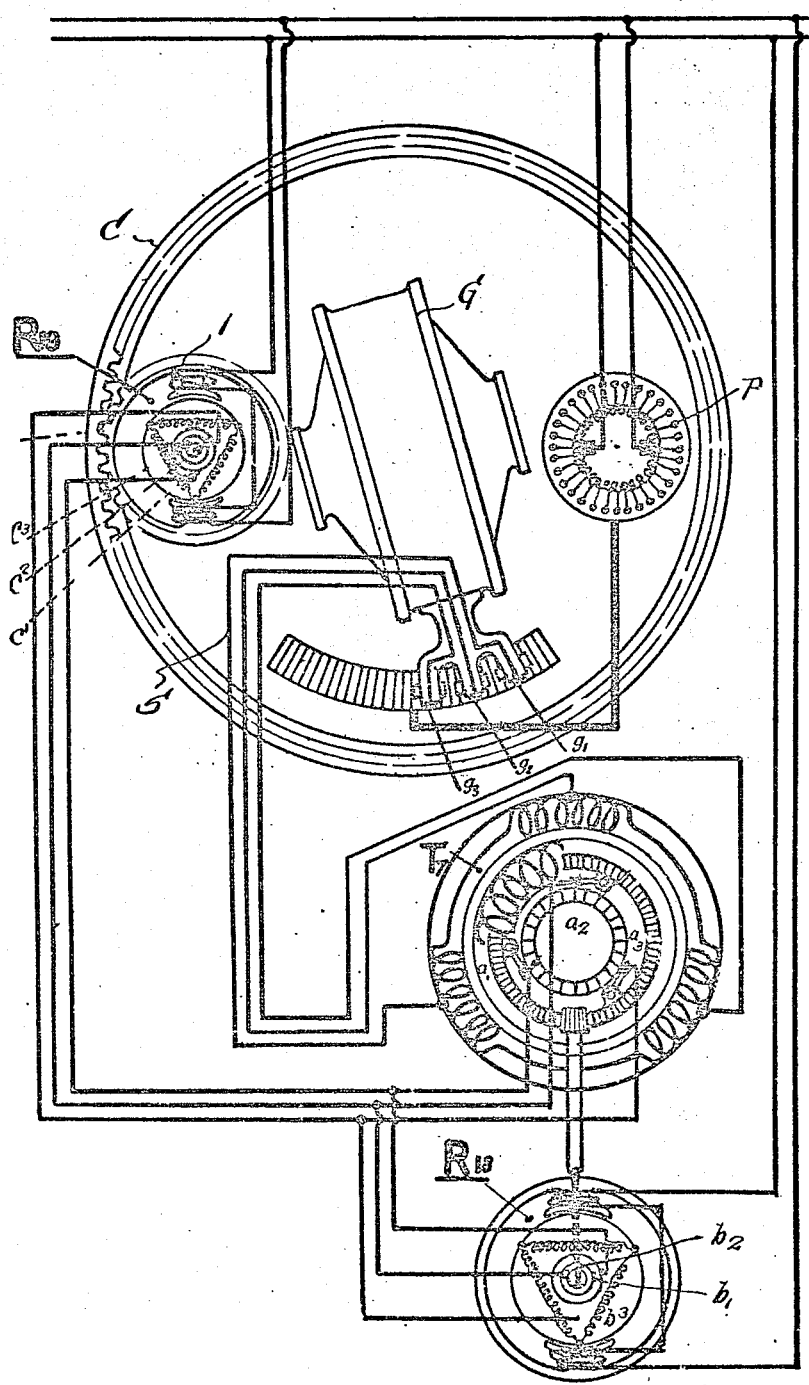
Fig. 6 is a diagram of the invention as applied to the control of a control system by a gyroscope borne by a phantom disc of the type described in my previous Patent 1,569,922.

On Figs. 6 and 7 is shown a distant control system of the type disclosed hereinabove controlled by a gyroscope borne by a rotating or "phantom" plate.

The gyroscope G can pivot with reference to its phantom plate S and bears three rollers $g_1$, $g_2$, $g_3$, which can move over the commutator D the blades of which are brought to different potentials by a potentiometer P fed by the mains and to the terminals of which the commutator blades are connected.

The main transmitter $T_7$ is supposed to work as a generator and its rotor is constantly rotated by the motor M fed by the D. C. mains. The three-phase stator of this transmitter is connected with the three rollers $g_1$ $g_2$ $g_3$, consequently its field distribution depends solely on the blades of the commutator with which the rollers $g_1$ $g_2$ $g_3$ are in contact at the moment considered.

To the main transmitter are connected a series of receivers not shown which can control for instance repeating roses or controlling parts as well as the rotors of the receivers $R_{18}$ $R_{19}$ described hereinbelow in greater detail. One of the windings of each of these receivers is fed by the mains and the other is fed with three-phase through wires connected with three normally stationary brushes $a_1$, $a_2$, $a_3$ rubbing on the commutator of the rotor of the main transmitter. If the gyroscope remains stationary with reference to its phantom plate, the potentials collected by these brushes will thus remain constant whereby the fields produced in the two windings of the several receivers and consequently these receivers will also remain stationary.

The receiver $R_{18}$ which keeps up the phase-shifting controls a movable set bearing the brushes $a_1$ $a_2$ $a_3$; the receiver $R_{19}$ which brings the phase shifting back to zero is borne by the phantom plate and controls a pinion I meshing with a stationary ring C whereby the said phantom plate will be rotated along in a manner similar to that of the corresponding receiver described in my previous Patent 1,519,932; the stators of the two receivers $R_{18}$ $R_{19}$ are fed from the mains and their rotors are fed through rings on which rub respectively the brushes $b_1$ $b_2$ $b_3$ and $c_1$ $c_2$ $c_3$, the brushes $b_1$ and $c_1$ being connected with the brushes $a_1$ of the main transmitter and so forth.

The working of the device is the following:

As it has been explained, when the gyroscope is stationary with reference to its phantom plate, the different receivers do not rotate. As soon as the gyroscope moves with reference to its phantom-plate when the head of the ship changes, the rollers $g_1$ $g_2$ $g_3$ move over the blades of the commutator D; they produce the rotation of the inducing field of the transmitter stator whereby the potentials vary under the rotating brushes of the commutator of the transmitter rotor. The rotor fields of the different receivers (or according to the connections used that of the stator) rotate by an angle proportional to the variation of head, whereby the said receivers rotate by the same angle. The receiver $R_{18}$ makes the set of brushes $a_1$, $a_2$, $a_3$ rotate which causes a further shifting between the fields and produces the continuous rotation of the different receivers to which the current is sent; the brushes $a_1$, $a_2$, $a_3$ continue therefore rotating until the initial shifting of the inducing field of the transmitter is brought back to zero through the action of the receiver $R_{19}$; the latter as explained in my previous Patent 1,569,922 makes the phantom plate rotate through the action of its pinion I on the stationary ring C. The arrangement of these parts is such as will bring back the commutator blades under the rollers of the gyroscope under which they should be normally disposed; at this moment the potentials sent into the stator winding of the transmitter return to their original value and thereby the armature field of the transmitter $T_7$ is brought back to its original position in space; the fields produced in the windings of the different receivers fed by the brushes $a_1$, $a_2$, $a_3$ return to their new position corresponding to the position taken in space by the gyroscope. The phase-shifting being thus suppressed the stoppage of the different receivers is final in this position as long as the gyroscope remains stationary with reference to the new position of its phantom plate; the relative movement of the said plate with reference to the gyroscope corresponding to the variation of head is thus brought back automatically to zero.

The connections described may evidently be slightly changed by replacing the rollers $g_1$ $g_2$ $g_3$ by two rollers connected with the mains and moving over the commutator of a potentiometer three equidistant points of which would in this case be connected with the stator winding of the transmitter T.

What I claim is:

1. Electric control system comprising a transmitter and a receiver disposed at the same transmitting station, other receivers at a certain distance from said transmitting station, a control device adapted to shift the phase of the current sent by the transmitter into all the receivers with reference to the mains feeding the transmitter and means whereby the first mentioned receiver is adapted to keep up the phase shifting obtained.

2. Electric control system comprising an electric machine working as a transmitter and constituted by a stator, a rotor with its commutator and a set of movable brushes rubbing on said commutator, a receiver, a transmission whereby the said set of brushes is under permanent control of the said receiver, means for shifting the potential under the movable brushes, a number of other receivers, and feed wires connecting the movable brushes with a component of each receiver.

3. Electric control system comprising an electric machine working as a transmitter and constituted by a stator, a rotor with its commutator and two sets of movable brushes rubbing on said commutator and one of which is connected with the wires feeding the rotor, a receiver, a transmission whereby the said receiver controls one of the sets of brushes, a control device adapted to shift the position of the other set of brushes, a number of other receivers and feed wires connecting a component of each receiver with the set of brushes which is not connected with the wires feeding the transmitter rotor.

4. Electric control system comprising an electric machine working as a transmitter and constituted by a stator, a rotor with its commutator and two sets of brushes cooperating with the transmitter and one of which is movable and connected with the wires feeding the exciting current, a receiver controlling one set of brushes, a number of other receivers, a control device adapted to shift the phase of the exciting current and feed wires connecting the set of brushes not connected with the wires feeding the exciting current with a component of each receiver.

5. Electric control system comprising an electric machine working as a transmitter and constituted by a stator, a rotor with its commutator and two sets of brushes cooperating with the transmitter and one of which is movable and connected with the wires feeding the exciting current, a receiver controlling one set of brushes, a number of other receivers, feed wires connecting the set of brushes not connected with the wires feeding the exciting current with a component of each receiver, a static transmitter, movable brushes moving over said static transmitter, a part controlling last mentioned brushes and wires connecting same with the first mentioned set of brushes cooperating with the first transmitter.

6. Electric control system comprising an electric machine working as a transmitter, and constituted by a stator, a rotor with its commutator and a set of movable brushes rubbing on the rotor commutator, a receiver controlling the said set of brushes, feed wires connecting the brushes with a component of each receiver, an auxiliary transmitter adapted to rotate synchronously with the first transmitter, a movable set of brushes collecting from the auxiliary transmitter the current serving as exciting current for the main transmitter and a control device controlling the said second set of brushes.

7. Electric control system comprising a transmitter and a receiver disposed at the same transmitting station, other receivers at a certain distance from said transmitting station, a control device adapted to shift the phase of the current sent by the transmitter into all the receivers with reference to the current from the mains feeding the transmitter and means whereby the first mentioned receiver is adapted to keep up the phase shifting obtained, and a differential the primary and secondary of which are controlled by suitable parts and the planetary pinions of which control the said control device.

8. Electric control system comprising a transmitter and a receiver disposed at the same transmitting station, other receivers at a certain distance from said transmitting station, a control device adapted to shift the phase of the current sent by the transmitter into all the receivers with reference to the current from the mains feeding the transmitter and means whereby the first mentioned receiver is adapted to keep up the phase shifting obtained, a pointing device controlled by the receiver disposed at the receiving station and guns actuated by the corresponding receivers.

9. A series of control systems as claimed in claim 1 the components of a number of receivers of which are fed by the transmitters of two control systems.

10. Electric control system comprising a transmitter and a receiver disposed at the same transmitting station, other receivers at a certain distance from said transmitting station, a control device adapted to shift the phase of the current sent by the transmitter into all the receivers with reference to the current from the mains feeding the transmitter and means whereby the first mentioned receiver is adapted to keep up the phase shifting obtained, an apparatus driven by a small power controlling the control device and means whereby one of the other receivers is adapted to bring the phase shifting back to zero when the said apparatus stops.

11. Electric control system comprising a transmitter a rotating plate, a gyroscopic apparatus pivotally borne by said rotating plate, contacting parts secured to said apparatus, a potentiometer and a distributor cooperating with the said contacting parts, borne by same and connected together, means for connecting the potentiometer with the transmitter, a certain number of receivers, means for connecting a component of each receiver with the movable brushes of transmitter, means whereby one of the receivers controls the set of movable brushes of the transmitter and means whereby another receiver brings the said plate constantly back into the same position with reference to the gyroscopic apparatus.

In testimony whereof I affix my signature.

ELIE GRANAT.